W. B. S. WHALEY.
METHOD AND APPARATUS FOR CONTROLLING THE CONDITION OF AIR IN COMPARTMENTS.
APPLICATION FILED DEC. 4, 1916.
1,384,367.
Patented July 12, 1921.
2 SHEETS—SHEET 1.
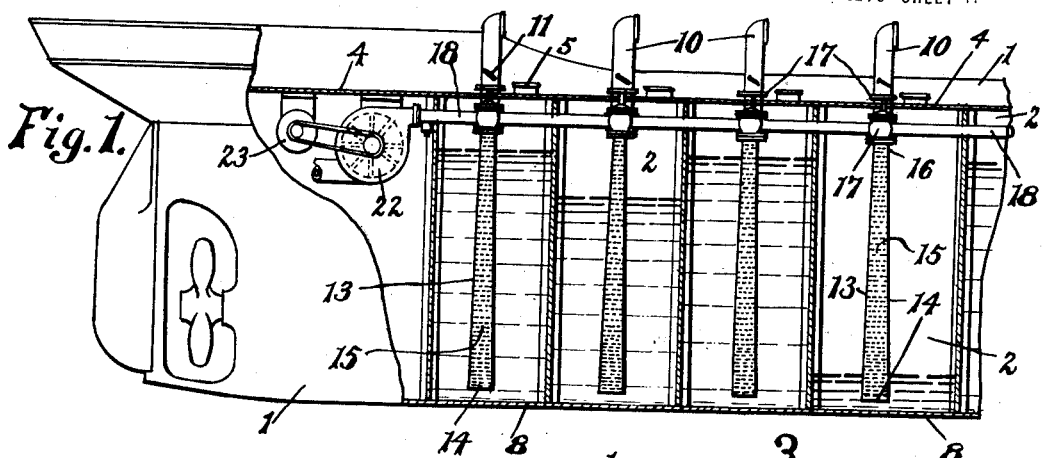
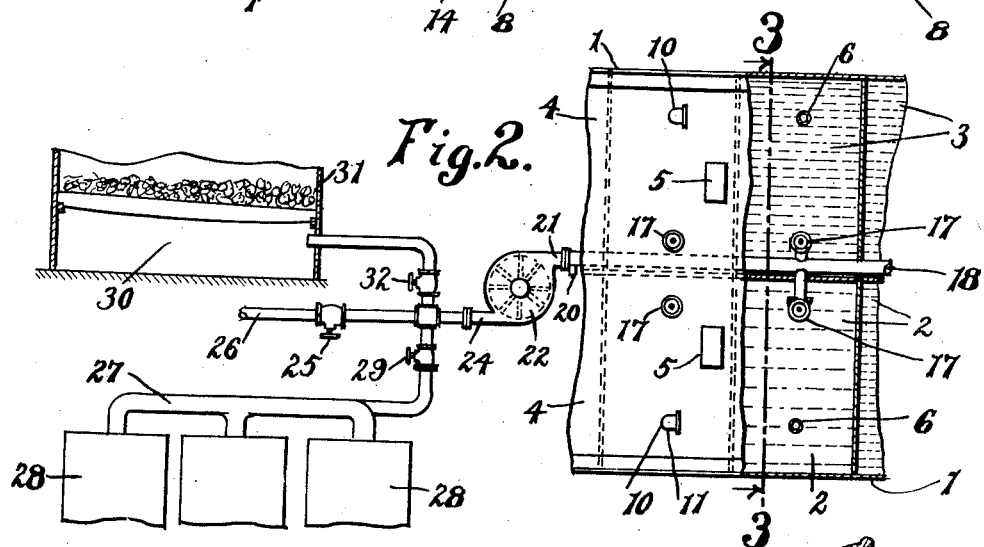
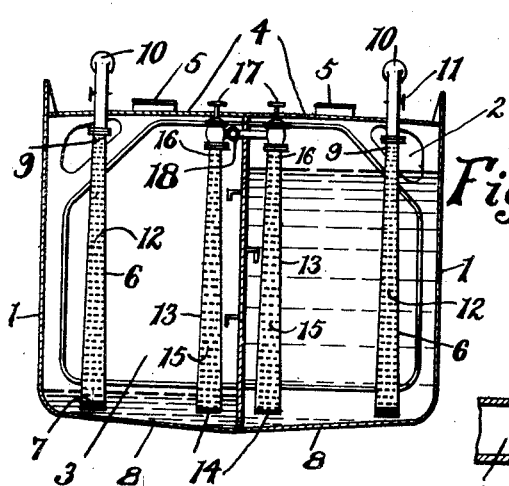
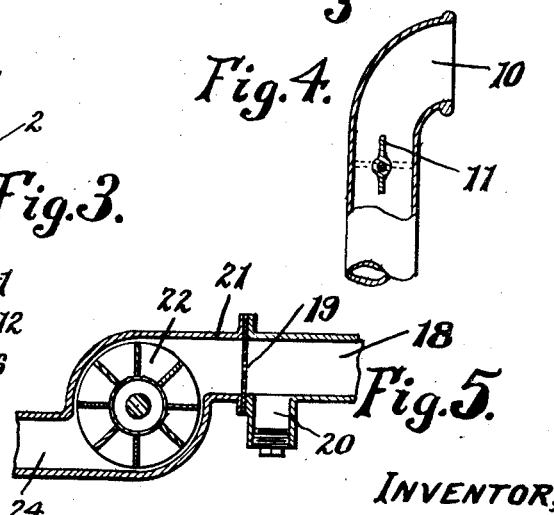
INVENTOR,
William B. Smith Whaley
BY David Lichtenstein
ATT'Y.

W. B. S. WHALEY.
METHOD AND APPARATUS FOR CONTROLLING THE CONDITION OF AIR IN COMPARTMENTS.
APPLICATION FILED DEC. 4, 1916.
1,384,367.
Patented July 12, 1921.
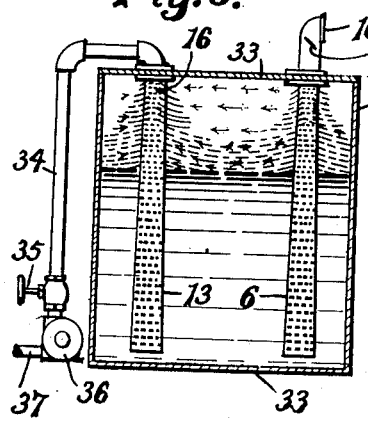
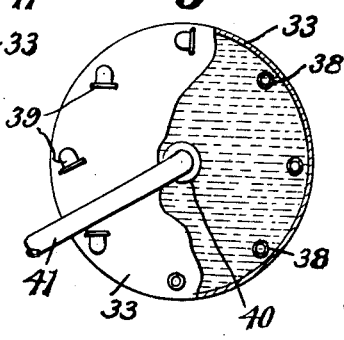
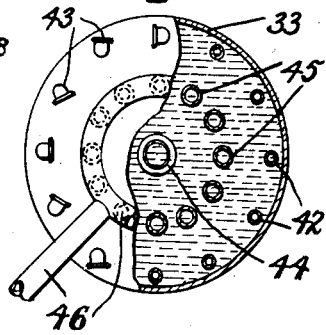
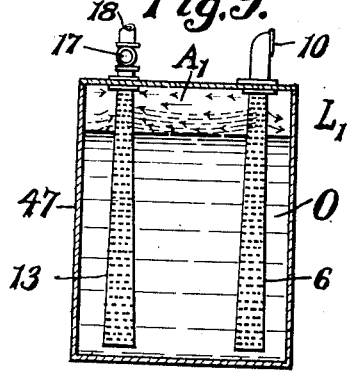
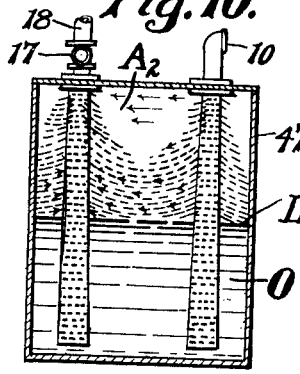
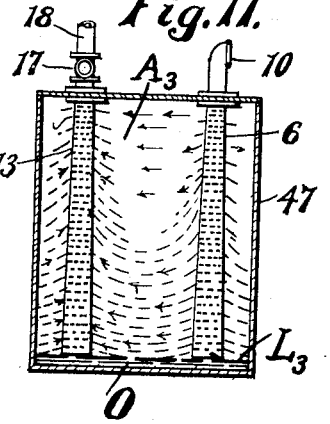
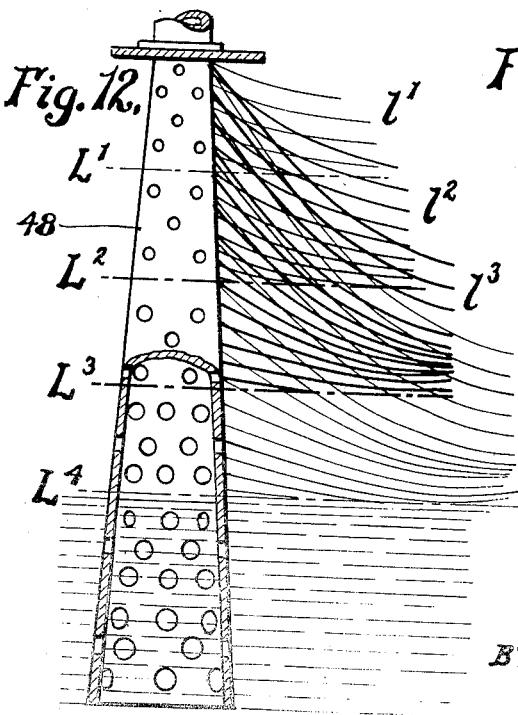
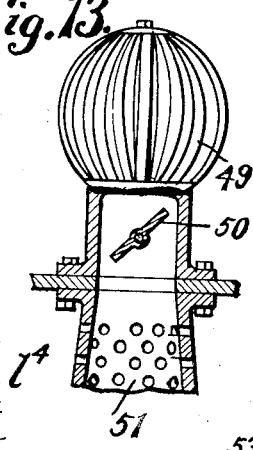
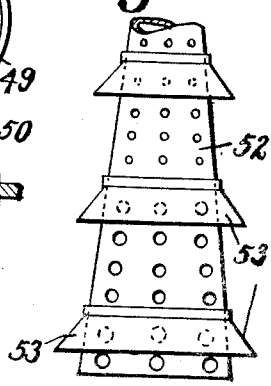
INVENTOR,
William B. Smith Whaley
BY David Lichtenstein
ATTY.

UNITED STATES PATENT OFFICE.

WILLIAM B. SMITH WHALEY, OF MALDEN, MASSACHUSETTS, ASSIGNOR TO AMERICAN WHALEY ENGINE COMPANY, OF BOSTON, MASSACHUSETTS, A CORPORATION OF MASSACHUSETTS.

METHOD AND APPARATUS FOR CONTROLLING THE CONDITION OF AIR IN COMPARTMENTS.

1,384,367.           Specification of Letters Patent.    Patented July 12, 1921.

Application filed December 4, 1916. Serial No. 134,900.

*To all whom it may concern:*

Be it known that I, WILLIAM B. SMITH WHALEY, a citizen of the United States, residing at Malden, in the county of Middlesex and State of Massachusetts, have invented a new and useful Method and Apparatus for Controlling the Condition of Air in Compartments, of which the following is a specification.

The object of my invention is to provide a method and apparatus therefor for controlling the condition of the air in a compartment, within which is housed matter tending to give off noxious, poisonous or combustible fumes or particles, etc., by removing the foul or contaminated air from within the unoccupied space of the compartment and by supplying in its stead pure air from atmosphere,—it being a known fact in the case of matter giving off combustible fumes or particles, etc., that if such fumes or particles are allowed to co-mingle with the air in the unoccupied space of the compartment in which the matter is kept, and if allowed to become pocketed therein to any extent the same becomes dangerous, being especially true in the case of compartments containing hydrocarbons, or other such combustible matter, in all of which instances the air co-mingling therewith becomes highly ignitible and dynamic and readily explosive, from which condition great damage to life and property often results; and again in the case of matter giving off noxious or poisonous fumes or odors, such as sulfur or reclaimed sewage, etc., it is also a known fact that the air in the compartment co-mingling therewith becomes unsanitary, and in some cases dangerous to life or property.

Therefore, to control the air within compartments, containing odorous, poisonous or combustible matter, by preventing the air within the compartment from becoming contaminated with the fumes, odors or particles given off by such matter, and by further preventing the same from becoming pocketed therein, is the purpose of my method and apparatus herein claimed,—the same being specially intended to set up a circulation within the unoccupied section of the compartment so that the same is thoroughly ventilated and scavenged and supplied with pure air from atmosphere, whereby the condition of the air in the unoccupied section of the compartment may be controlled and maintained in such a degree and state as will render the same safe and reliable.

The method and apparatus therefor, as herein disclosed, is applicable to a great variety of different uses, without limitation, some of which are in connection with any and all kinds of containers, receptacles, mines, chemical plants, tanks, oil tanks, marine tankers, etc., which contain and house, or treat with, matter which naturally tends to give off noxious, poisonous, or combustible fumes or particles, etc.

And to illustrate my invention and without being limited thereto, I shall explain the use and application thereof more particularly in connection with land and marine types of storage tanks used for the housing of hydrocarbons, the marine application being shown in connection with the so-called "marine tanker" which is a vessel subdivided into a plurality of compartments which are supplied with hydrocarbons to be conveyed thereby, and in which marine types of storage tanks the most dangerous conditions exist because of the co-mingling of the fumes or particles given off by the oils therein with the air in the unoccupied spaces of the tanks or compartments thereof, and which co-mingled air, if allowed to pocket therein, soon reaches and goes beyond the "flash-point," in which state the same is readily susceptible to combustion and explosion, and is therefore dangerous.

The terms employed herein are used in the generic and descriptive sense, and therefore are not intended primarily as terms of limitation; as for example, the term "compartment" refers to the interiors of containers, receptacles, tanks, etc., the term "scavenge" means to cleanse, sweep, ventilate, circulate, force out, etc.; and the term "contaminated" means co-mingled, influenced, or affected, etc.

Referring to the accompanying two sheets of drawings, in which two specific embodiments of my invention are shown in order to describe the same (without being limited thereto) and wherein the invention is employed in connection with land types of oil-tanks used for storing hydrocarbons, and in marine types of oil-tankers used for conveying such hydrocarbons,—

Figure 1 represents a part sectional view taken longitudinally through a so-called "marine tanker" and shows a plurality of the storage compartments supplied with hydrocarbons and equipped with my invention.

Fig. 2 represents a diagrammatic plan view of Fig. 1, showing the tanker partly sectioned with the trunk-pipe of my invention connected to discharge through the suction member thereof into atmosphere, or alternatively into an "intake" pipe of a gas engine, as one of the possible uses of such discharging air, or into an ash-pit of a furnace, as another of the possible uses of said discharging air.

Fig. 3 represents a transverse sectional view taken on line 3—3 in Fig. 2 looking in the direction of the arrows, showing two adjacent tanker compartments charged with oils at different levels.

Fig. 4 represents a sectional view taken through the funnel or air-admission-member of the induction member of the device, showing the regulating means thereof.

Fig. 5 represents a longitudinal sectional view taken through the suction member and the portion of the trunk-pipe connected therewith, showing the employment of a preferred gauze partition in the trunk-pipe for preventing entrained particles from passing the same, and a trap for cleaning out purposes in connection therewith.

Fig. 6 represents schematically a land type of oil tank supplied with my air-scavenging device, showing the tank charged with oil and the device in operation, scavenging the tank and keeping it free of dead or carbureted air collecting therein.

Fig. 7 represents a plan view of a land type of oil tank, showing the same equipped with a modified type of air-scavenger; the same consisting of a plurality of induction members positioned within the tank near the shell thereof and a common suction member centrally located within the tank for furnishing a greater range of sweep throughout the tank.

Fig. 8 represents a similar view to that shown in Fig. 7 but shows another modification of the air scavenging device, in that the same is provided with a plurality of induction members positioned around the tank and nearest to the shell thereof; a single central induction member in the center of the tank; and a plurality of suction and draw-off members positioned in the tank intermediate said induction members.

Fig. 9 represents a diagrammatic sectional view of a compartment equipped with my air-scavenging device, showing the compartment almost full of matter and the schematic operation of the air-scavenging device in the unoccupied air space of the compartment.

Fig. 10 is a similar view to that shown in Fig. 9, but shows the compartment half full of matter, and the corresponding operation of the air-scavenging device in the unoccupied space of the compartment.

Fig. 11 is a similar view to that shown in Figs. 9 and 10 but shows the compartment practically empty and the corresponding operation of the air-scavenging device in the unoccupied air space of the compartment.

Fig. 12 represents a diagrammatic view of an induction member of the device, and shows the volumetric sweep and introduction of pure air entering the compartment therethrough which sweeps toward the top surface of the matter in the compartment where the heaviest air is most likely to settle and which air is the most carbureted and therefore the most dangerous.

Fig. 13 represents a rotary type of ventilator which may be used in connection with the induction member of the device in place of the funnel shown in the other views of the drawings.

Fig. 14 represents a modified type of induction or draw-off member for the device, showing the same supplied with deflectors for deflecting the incoming air in the case of the induction member to sweep down toward the top surface of the product in the container, and in the case of the draw-off member, to direct upwardly the air nearest to said surface.

Like numerals refer to like parts throughout the several views of the drawings.

The numeral 1 in its entirety represents the hull of a so-called "marine tanker" which, in practice, is used more particularly for the conveying of hydrocarbons, and is commonly divided into a double row along the length of the tanker of separate and adjacent compartments 2 and 3 on either side of the vessel, which compartments are each usually supplied in the deck 4 of the tanker 1 with the hatches 5. Each individual compartment 2 and 3 of the tanker is supplied with the hollow and tapered induction member 6 of my device, which projects preferably vertically downward from the deck 4 of the tanker into the respective compartments 2 and 3 and terminates with the end 7, which is the widest portion thereof, near to the bottom 8 of the compartments 2 and 3 of the tanker.

The induction member 6 is rigidly secured in set position within the compartment in any suitable manner and communicates at the top 9 thereof with any suitable type of ventilating device, as for example, an ordinary marine type of funnel 10, or the like, which is open to atmosphere and is preferably provided with the regulating damper 11 for throttling purposes. The induction member 6 is preferably made tapering or flared toward the open bottom 7 thereof, and is provided with suitable perforations 12 in the shell of the same which open the interior or hollow of the induction member to the compartment within which the same is positioned, and which perforations 12 may be graduated along the length of the induction member 6, according as may be found necessary, to properly permit the directing of the incoming air from atmosphere to discharge therethrough and into the compartment in a manner which will force it to approach the top surface of the product or matter contained in the compartment, regardless of the location of said surface of the product or matter contained therein.

The numeral 13 represents the draw-off member of the device which is similar in construction to the induction member 6 already described, and which is supported in a similar manner to that of the induction member 6 with the open bottom 14 thereof terminating near to the bottom 8 of the tank compartment. 15 are the perforations which open the interior of the draw-off member to the compartment, and which are also graduated along the draw-off member to give increased open areas as the diameter of the same increases toward the bottom thereof. The upper end 16 of the draw-off member 13, in the case of the tanker application of the device, is preferably provided with the regulating valve 17 which may be controlled from the deck 4 of the tanker and is open to and communicates with the trunk-pipe 18; while in the case of the land type of tank, the regulating valve may be positioned at any other convenient point, as indicated in Fig. 6. The trunk-pipe 18 is preferably supplied with a wire gauze partition 19 and a clean-out trap 20, and connects with the suction end 21 of the suction member 22 which is preferably of the rotary fan type which may be rotated, to produce a suction in the trunk-pipe 18, by any suitable means, as by the action of the motor 23 driving the same as shown in Fig. 1. The suction member 22 discharges through the discharge pipe 24 which may be open to atmosphere as is suggested in Fig. 2, through the valve 25 and the pipe 26, or may be connected to discharge into the intake pipe 27 of the gas engine 28 through the valve 29, or may be open to discharge into the ash-pit 30 of a boiler furnace 31, or the like, through the valve 32, or may be directed to any other apparatus, according as may be desired.

Fig. 6 represents a diagrammatic view showing a land type of oil tank which is used for storing oils and which consists of the ordinary tank-member 33 supplied, as in the case of the individual compartments described in connection with the oil tanker, with the induction-member 6 which projects into the tank-member 33 and terminates near to the bottom thereof, and is secured in any suitable manner to remain in set position therein, the same being also graduated with perforations and open to atmosphere through any suitable ventilating member, as for example, the funnel 10 which is regulated and throttled by means of the damper 11,—it being understood here that any suitable form of ventilating member, such as is used in skylights or roofs of buildings, as for example, the rotary hood-type shown in Fig. 13, may be used in connection with the induction member for keeping the same open to atmosphere for allowing the entrance of fresh air into the tank through said induction member of the device. The tank-member 33 is also provided with the draw-off member 13 which is also similar in construction and similarly secured in the tank, as was explained in the case of the draw-off member described in connection with the tanker. The draw-off member 13 at the top 16 thereof is connected by means of the pipe 34 through the valve 35 with the suction member 36 which is also preferably of the rotary fan type of suction member, and which discharges through the outlet 37, either into atmosphere or wherever else the same may be desired to be directed, by means of suitable pipe connections.

In Fig. 7, the tank-member 33 is shown supplied with a circumferential series of induction members 38 which are open to atmosphere through suitable funnels or the like 39, and are positioned near to the shell of the tank-member 33; while 40 is a centrally located draw-off member which communicates with the suction member of the device through the draw-off pipe 41,—said Fig. 7 embodying a modification of the device, in that the same consists of a circumferential series of induction members suitably positioned around the interior of the tank and nearest to the shell thereof, which, when co-acting with the centrally located draw-off member, enables the device to set up a more forceful scavenging effect within the tank.

Fig. 8 also discloses a modification of the air-scavenging device, in that the same consists of a circumferential series of induction members 42 positioned within the tank 33 and near to the shell thereof, which induction members are also provided with suitable inlet members, such as funnels 43, or the like, which open the induction members 42 to atmosphere; a centrally located induction member 44 which is also provided with a suitable inlet member which opens the same to atmosphere; and a circumferential series of intermediate draw-off members 45 which communicate with the trunk-pipe 46, which in turn communicates through a suitable regulating valve with the suction member of the device.

In the diagrammatic Figs. 9, 10 and 11, 47 represents the container member supplied with the liquid "O" with the respective levels $L_1$, $L_2$ and $L_3$ leaving the unoccupied air spaces $A^1$, $A^2$ and $A^3$, respectively, in the containers 47.

In Fig. 12, 48 represents diagrammatically the graduated and perforated induction member of the device. $L^1$, $L^2$, $L^3$ and $L^4$ represent different or varying levels of the product contained in the compartment, within which the scavenging device is operating. $1^1$, $1^2$, $1^3$ and $1^4$ represent the corresponding volumetric sweeps, respectively, for the levels $L^1$, $L^2$, $L^3$ and $L^4$ of the incoming air introduced through the induction member into the container, the bottom section of the induction member 48 being broken away to show the product included therein, which naturally enters the same through the perforations and open bottom thereof and assumes the same level as the product outside surrounding the same. It will be here noted that the same Fig. 12 applies to the draw-off member of the device since the design of the draw-off member is similar to that of the induction member, but because the latter introduces air into the compartment while the former sucks air therefrom, the volumetric work done in either case will be similarly located along the members but the direction of the air will be reversed.

In Fig. 13, 49 represents a rotary type of ventilating hood which may be used in place of the funnel member 10 shown in the other views of the drawings, and which is also preferably supplied with the damper 50 for regulating the incoming air which enters the induction member 51 therein shown,—it being here noted that the use of the damper in the air-admitting-member of the device in connection with individual tanks of the land type, may be omitted, since the necessary regulation of the incoming charge may be accomplished through the proper manipulation of the draw-off valve alone, but where the device is coupled with a battery consisting of a plurality of tanks, the dampers in the air-admitting-members of the device are necessary and will serve to allow better regulation in the individual tanks of said battery as may occur when one of the tanks has been practically emptied, and therefore requires a greater volume of air to circulate therethrough as against the other tanks of the battery which are almost filled and which require less air to be admitted therein, or as in the case of marine tankers (Fig. 1) wherein the levels of the hydrocarbons in the various compartments thereof are different and require different amounts of air for properly scavenging the air spaces therein. In the latter instances the dampers will assist materially in the regulation of the individual compartments according as the conditions therein require.

In Fig. 14, 52 represents a modified type of induction or draw-off member which is supplied with the deflector rings 53, which rings, in the case of the induction member, tend to direct the incoming air discharged from the induction member downwardly toward the upper surface of the product.

Having thus described the parts of the apparatus of my invention in detail, which enables me to carry out the method of scavenging and purifying the air in the unoccupied spaces within compartments containing animal, mineral, or vegetable products or matter, such as naturally tend to give off noxious, poisonous or combustible fumes or particles, etc., and which, especially in the case of carboniferous products or matter, if allowed to co-mingle with the air in the unoccupied space of the compartment and allowed to remain and pocket in said compartment, becomes a dangerous medium therein, it will be understood that the principle and object of the invention is to enable the removal of such dangerous and objectionable medium from the compartment and to prevent the same from becoming pocketed therein. The manner of employing both the method and the apparatus therefor in carrying out the principle of the invention, is as follows:

It must here be remembered, as has already been suggested, that I am claiming the use of my method and apparatus therefor for scavenging the air in compartments containing products or matter of a nature which tend to give off noxious, poisonous, or combustible fumes or particles, etc., in connection with any and all kinds of land or marine containers without limitation. And for the purpose of explaining the principle and working thereof in my specification and drawings, I have applied the same to the common type of storage tank used for storing oils and to the common type of marine tanker used for the transporting of such oils by water, which applications disclose but two of the many practical uses that the same is intended for and to which the method and apparatus may be put.

To begin with, the regulating dampers of the inlet-members of the device, which are open to atmosphere and shown in the drawings in the nature of funnels 10 or ventilating hoods 49 (Figs. 4 and 13, respectively), must be open to admit the air from atmosphere; the draw-off valves 17 of the draw-off members of the device must also be regulated so that the same will be open to the trunk-pipe of the device; the discharge-valve 25 should be open to discharge into atmosphere, or the proper valve 29 or 32 should be open in its stead to discharge into the engine 28 or into the ash-pit 30 of the furnace 31, according as may be desired; and the suction member 22 should be set into operation for producing the necessary suction to draw off the pocketed air from the unoccupied space of the compartment containing the product. With the regulating members thus set into working operation and the suction member started running, a suction is thus created within the unoccupied space of the compartment through the draw-off member 13, which naturally draws off air from within the unoccupied space of the compartment, above the product or matter included therein, through the uncovered or exposed section of the draw-off member 13 which has the graduated perforations therein provided for the purpose and which are free and open in that uncovered or exposed section of the draw-off member 13. The covered or immersed portion of the draw-off member (which is surrounded by and filled with the product in the compartment and in which the perforations thereof and the bottom opening therein are naturally closed by the product itself) leaves no chance for work to be done by such covered or immersed section of the draw-off member of the device. Thus the working part of the draw-off member of device is limited to the uncovered portion thereof which naturally lies within the unoccupied space of the compartment. In a similar manner and for similar reasons the working part of the induction member of the device is also limited to the uncovered portion thereof, which is also naturally located within the unoccupied space of the compartment, so that, as is indicated in Fig. 9 where the top surface of the product "O" within the compartment 47 is $L_1$ and is almost at the top of the compartment, the action of the device is thus entirely limited within the unoccupied section $A^1$ thereof, which is naturally above the top surface $L_1$ of the product.

Now, for the purpose of directing the greatest volumetric sweep of the pure air coming in from atmosphere and entering the unoccupied space of the compartment through the induction member toward the top surface of the product or matter contained in the compartment, in which region the heaviest air (which is the most contaminated) in the unoccupied section of the compartment is most likely to settle and regardless of the varying location of said top surface due to change of quantity of product or matter in the compartment, and for the purpose of more particularly drawing off such heavy air settling in the region nearest to the top surface of the product, both the induction and the draw-off members of the device are made tapered or flared toward the bottoms thereof, so that greater sectional areas are provided within the hollow of the members themselves as the unoccupied air space in the compartment becomes greater.

The increasing taper of the induction and draw-off members provides for correspondingly increased areas of perforations in the members in the wider sections thereof, and thus yields a graduated perforating feature to said members, the members each being preferably designed to have the area of any particular cross-section thereof 10%, or better in excess of the total areas of the perforations above said cross-section. Wherefore, the incoming air in the induction member will be largely discharged through the lower uncovered portion thereof and will thus be brought into contact with the top of the matter in the compartment, regardless of the level in said compartment of the matter or substance occupying same. In the case of an empty compartment, the greater portion of the discharge from the induction member will be swept toward the bottom of the compartment. Similarly the draw-off member will suck in the greater portion of air or gas to be discharged thereby at the lower uncovered portion thereof, and in that manner will draw off the air or gas nearest the top surface of the contents in the compartment, and thus free the same of the heavier or contaminated air or gas therein, negativing thereby the possibility of explosion or the creation of a nuisance, depending upon the nature of the stored matter in the compartment. A volumetric sweeping action is thus set up in the compartment, which functions largely in the zone nearest the surface of the contents in the compartment; it being here understood that a sort of eddying action is set up above said zone which is sufficient to clear the upper unoccupied portion of the compartment, where the lighter air or gas naturally settles and which is not so troublesome as the heavier air or gas lying in the zone nearest the surface of the matter in the compartment. The two members, namely, the induction and draw-off members, thus coöperating, provide a reliable scavenging feature for the compartment, and positively assure the compartment against any possibility of pocketing or trapping air or gas therein, which may have become contaminated by commingling with the contents thereof and conditioned to reach the flash point which makes the same dangerous.

The two members are preferably made similar to each other and have the bottoms thereof preferably terminating near to the bottom of the compartment, whereby an empty compartment, as in the case of an oil tank which is usually left with a film of oil on the bottom thereof, is thoroughly scavenged and no possible chance for an explosion can exist, it being a known fact that oil tanks which are not completely drained are great menaces in that regard because of the pocketed air therein, and have, in many cases, been the direct causes for serious explosions.

It may thus be observed that the working effect of the method and the device herein disclosed may be regulated to suit the peculiar requirements, as for example, by varying the speed of the suction member of the device, or by regulating the valves connected with the device for varying the supply of the incoming air into the compartment, or the outgoing air through the draw-off member of the compartment according as may be desired.

It may also be observed that any number of induction members or draw-off members without limitation, may be employed in the same compartment, according as may be found necessary, depending upon the capacity of the compartment and the nature of the matter housed therein.

It may also be observed that my method and apparatus therefor may be positively relied upon and is effective in ridding compartments of contaminated airs accumulating therein in the unoccupied spaces thereof as rapidly as the same are generated therein and simultaneously introduces therein in its stead pure air from atmosphere which maintains a condition of perfect safety within the compartment.

The method and apparatus therefore is also very useful in connection with compartments housing noxious or poisonous matter, which give off noxious or poisonous fumes or odors, for controlling the same and for enabling the drawing off thereof therefrom as fast as the same are generated therein, and thus fills a long-felt want in chemical plants and the like, where fumes and odors are generated which are dangerous to life or property.

Thus it may be noted that the principle of my method and apparatus therefor is applicable to both instances,—whether to relieve the dangerous conditions existing within compartments housing carboniferous matter caused by the combustible fumes or particles, etc., given off by said matter which acts upon and affects the air in the unoccupied space of the compartment to a degree which renders the same dynamic and dangerous; or to relieve and carry off noxious or poisonous fumes or odors generated in compartments housing noxious or poisonous matters, so that such fumes or odors may not escape into places wherein the same may prove unsanitary or dangerous to life or property. And further, it may be noted that the principle of my invention is applicable to a great variety of specific uses as has already been suggested herein in connection with containers, receptacles, storage plants, chemical plants, freight vessels, ships, tanks, oil-tanks, marine tankers, etc., to equal advantage and will positively remove therefrom objectionable and dangerous conditions otherwise existing therein.

It will also be observed that the invention is based upon fundamental thermodynamic performances which are absolutely reliable, requiring in this case the simplest kinds of apparatus, which may be easily applied to existing outfits as well as to new ones at comparatively small expense, and may be maintained at the lowest possible cost with practically no chance of becoming inoperative; the device in action providing a continuous, automatic purifying system for various lines of uses for the purposes herein set forth, and regardless as to the quantity of matter supplied in the compartment in which the device is operating and regardless as to whether such quantity remains constant or variable. And further, the system and device therefor may be operated on but a single compartment or on a plurality of compartments to equal advantage.

While the preferred embodiments of my invention have been described in detail, it will be understood that I do not wish to be limited to the particular construction set forth, since various changes in the form, material, proportions, and arrangement of parts, and in the details of construction may be resorted to without departing from the spirit and scope of the invention, or destroying any of the advantages contained in the same, heretofore described and defined in the subjoined claims.

What I claim is:—

1. A method of scavenging air in partly occupied compartments containing fume, or odor emitting matter, consisting in withdrawing variable quantities of air from the unoccupied or air space of the compartment in relation to the depth thereof with the greater portion being withdrawn from the zone toward the lower section of said unoccupied or air space; and drawing in purer air from without the compartment and discharging the same within said unoccupied or air space in similar variable quantities with the greater portions directed toward the bottom zone of said air space for replacing the air withdrawn therefrom.

2. A method of scavenging air in partly occupied compartments containing fume, or odor emitting matter, consisting in causing fresh air from without the compartment to be drawn into the air space within the same with the greater force and volume thereof directed toward the air zone adjacent to the top surface of the matter within the compartment; circulating said incoming air in variable portions within said air space; and drawing off the contaminated air from within said air- space with the great volume of draught directed also toward the aforesaid zone.

3. A method of scavenging air in partly occupied compartments containing fume, or odor emitting matter, consisting in drawing off by suction the air within the unoccupied or air space of said compartment in variable currents or layers, the greater volumetric currents or layers approaching the lower section of said air space; creating a suction within said air space by the drawing off of the air therein, as above stated; and drawing fresh air from without the compartment into the unoccupied or air space thereof by the suction created therein similarly, in variable currents or layers, the greater volumetric currents or layers also approaching the lower sections of said air space to replace the drawn off air therefrom.

4. An air-scavenging device consisting of tapered and perforated induction means adapted to supply air from atmosphere to a compartment to be scavenged in variable currents and in relation to and throughout the depth thereof with the greater volume directed toward the lower section; similar tapered and perforated means adapted to draw off contaminated air from within said compartment in a relatively corresponding manner to the way the supply discharges the fresh air to said compartment; and suction means coupled with said draw-off means for creating a suction within said compartment for effecting a scavenging influence within the same.

5. An air-scavenging device consisting of induction means adapted to supply air from atmosphere to a compartment to be scavenged in variable currents increasing in relation to the depth thereof; means for regulating the introduction of said supply of air; means adapted to draw off contaminated air from said compartment in variable currents increasing in relation to the depth thereof; and suction means coupled with said draw-off means adapted to discharge the contaminated air drawn off by said means and to create a suction within said compartment for effecting a continuous scavenging influence within the same.

6. An air-scavenging device consisting of a tapered and perforated induction member open to atmosphere, communicating with the interior of the compartment to be scavenged and provided with graduated perforations increasing with the length of said induction member and toward the bottom thereof; a similar tapered and perforated draw-off member also communicating with the interior of the above compartment and similarly graduated; and a suction member coupled with said draw-off member adapted to create a circulation of air drawn in from atmosphere within said compartment and thereafter to discharge the same therethrough.

7. An air-scavenging device for variably supplied matter-storing-compartments, consisting of an upright and tapered air supply member having the top and smaller end thereof open to atmosphere, said tapered member projecting into the compartment proper and provided with perforations communicating with the interior of said compartment, said perforations increasing in size with the length of projection of said air supply member; a similarly tapered and perforated upright draw-off member also communicating with the interior of said compartment and provided with an outlet at the top and smaller end thereof projecting through said compartment; and a suction member coupled with the outlet of said draw-off member and adapted to draw contaminated air from the unoccupied space of said compartment and to discharge the same therefrom.

8. An air-scavenging device for variably supplied matter-storing-compartments consisting of regulatable air supply means adapted to open the interior of the compartment to atmosphere; tapering tubular vertically disposed induction means projecting downwardly within the interior of the compartment coupled with said supply means, having the larger end thereof open and positioned toward the bottom of the compartment and provided with perforations graduated throughout the length thereof, which variably open the bore of said induction means to the interior of the compartment in proportion to the increase in section of the induction means and in relation to the length of projection of said induction means; tapering tubular vertically disposed draw-off means similar in construction to said induction means and similarly set in the compartment; means communicating with the top of said draw-off means adapted to receive the air drawn off thereby; regulating means for said receiving means; suction means coupled with said receiving means; and means for driving said suction means.

9. An air scavenging device of the character described having provision of means for supplying air to closed compartments containing volatile matter and adapted to direct and pass said air substantially along the surface of said matter at any level thereof and means for removing vapors arising therefrom adapted to draw off the same substantially from the surface of said matter at any level thereof.

WILLIAM B. SMITH WHALEY.